(12) United States Patent
Klimpel

(10) Patent No.: US 11,273,918 B2
(45) Date of Patent: Mar. 15, 2022

(54) AIRCRAFT COOLING SYSTEM AND AIRCRAFT WITH AIRCRAFT COOLING SYSTEM

(71) Applicant: Airbus Operations GmbH, Hamburg (DE)

(72) Inventor: Frank Klimpel, Hamburg (DE)

(73) Assignee: AIRBUS OPERATION GMBH, Hamburg (DE)

(*) Notice: Subject to any disclaimer, the term of this patent is extended or adjusted under 35 U.S.C. 154(b) by 353 days.

(21) Appl. No.: 16/384,297

(22) Filed: Apr. 15, 2019

(65) Prior Publication Data
US 2019/0322373 A1 Oct. 24, 2019

(30) Foreign Application Priority Data

Apr. 20, 2018 (DE) ...................... 10 2018 109 480.9

(51) Int. Cl.
*B64D 13/08* (2006.01)
*B64D 13/06* (2006.01)

(52) U.S. Cl.
CPC ............. *B64D 13/08* (2013.01); *B64D 13/06* (2013.01); *B64D 2013/0618* (2013.01); *B64D 2013/0674* (2013.01); *B64D 2013/0688* (2013.01)

(58) Field of Classification Search
CPC .................... B64D 13/06; B64D 13/08; B64D 2013/0618; B64D 2013/0674; B64D 2013/0688

(Continued)

(56) References Cited

U.S. PATENT DOCUMENTS 3,394,533 A 7/1968 Li et al.
3,878,692 A 4/1975 Steves
(Continued)

FOREIGN PATENT DOCUMENTS

DE 19963280 C1 8/2001
DE 102008053320 B4 5/2010
(Continued)

OTHER PUBLICATIONS

European Search Report for corresponding European Patent Application 19167497 dated Sep. 3, 2019.
German Search Report; priority document.

*Primary Examiner* — Allen R. B. Schult
(74) *Attorney, Agent, or Firm* — Greer, Burns & Crain, Ltd.

(57) ABSTRACT

An aircraft cooling system and an aircraft having an aircraft cooling system of this type. The aircraft cooling system comprises a ram air duct, a nozzle arranged in the ram air duct and connected to a first water-conducting line, and a refrigeration device. The refrigeration device comprises a heat exchanger thermally coupled to the refrigeration device and configured to release waste heat generated by the refrigeration device to cooling air present in the ram air duct, a first water separator configured to separate off water from the air cooled by the refrigeration device, and a water outlet configured to conduct water obtained in the first water separator into the first water-conducting line. Furthermore, the water outlet has an inlet configured to be connected to a second water-conducting line, wherein the water outlet is furthermore configured to generate a negative pressure at the inlet.

10 Claims, 2 Drawing Sheets

(58) Field of Classification Search
USPC .......................................................... 454/76
See application file for complete search history.

(56) References Cited

U.S. PATENT DOCUMENTS

| | | | |
|---|---|---|---|
| 4,262,495 A * | 4/1981 | Gupta | B64D 13/06 |
| | | | 62/172 |
| 6,519,969 B2 | 2/2003 | Sauterleute | |
| 6,925,818 B1 * | 8/2005 | Brown | F25B 9/004 |
| | | | 62/86 |
| 8,333,078 B2 | 12/2012 | Kelnhofer | |
| 2015/0121909 A1 | 5/2015 | Koenig et al. | |
| 2017/0152050 A1 | 6/2017 | Klimpel | |

FOREIGN PATENT DOCUMENTS

| | | |
|---|---|---|
| DE | 102015207447 A1 | 10/2016 |
| DE | 102015223548 A1 | 6/2017 |
| GB | 274107 A | 7/1928 |
| GB | 960504 A | 6/1964 |

* cited by examiner

AIRCRAFT COOLING SYSTEM AND AIRCRAFT WITH AIRCRAFT COOLING SYSTEM

CROSS-REFERENCES TO RELATED APPLICATIONS

This application claims the benefit of the German patent application No. 10 2018 109 480.9 filed on Apr. 20, 2018, the entire disclosures of which are incorporated herein by way of reference.

FIELD OF THE INVENTION

The invention relates to an aircraft cooling system having a refrigeration device, wherein water obtained by means of a water separator is discharged through a water outlet to which a further water-conducting line is connected with application of negative pressure, and furthermore relates to an aircraft having an aircraft cooling system of this type.

BACKGROUND OF THE INVENTION

In passenger transport aircraft, for the air-conditioning of the aircraft cabin, use is currently commonly made of so-called air-assisted air-conditioning systems, as described, for example, in DE 10 2008 053 320 B4 and U.S. Pat. No. 8,333,078 B2. An aircraft air-conditioning system serves for setting and maintaining a desired pressure, a desired temperature and a desired air humidity in an aircraft cabin. Furthermore, the aircraft air-conditioning system supplies sufficient fresh air into the aircraft cabin to ensure that a prescribed minimum fraction of fresh air is present in the aircraft cabin.

Air-assisted aircraft air-conditioning systems generally comprise an air-conditioning apparatus (also referred to as Air Conditioning Pack or merely Air Pack) to which compressed process air is supplied by the engines of the aircraft, by a separate compressor or by an auxiliary engine (APU, Auxiliary Power Unit). When the aircraft is in flight, use is predominantly made of engine bleed air for the supply of compressed process air to the air-conditioning apparatus of the aircraft air-conditioning system. By contrast, when the aircraft is in operation on the ground, compressed process air is conventionally supplied to the air-conditioning apparatus of the aircraft air-conditioning system by the auxiliary engine or by an aircraft-external air generating apparatus. In the air-conditioning apparatus, the process air is cooled and expanded as it flows through at least one heat exchanger unit and various compression and expansion units. Cooled process air emerging from the air-conditioning apparatus is finally conducted into a mixing chamber and mixed there with recirculation air discharged from an aircraft region to be air-conditioned. The mixed air from the mixing chamber is conducted via corresponding mixed-air lines into the aircraft region to be air-conditioned, which may be in the form of a passenger cabin, a cockpit, a freight compartment, a crew rest compartment or the like.

In the heat exchanger unit of the air-conditioning apparatus, for the cooling of the process air, a transfer of heat energy takes place from the hot process air to ambient air surrounding the aircraft. The ambient air surrounding the aircraft is supplied to the heat exchanger unit, for example, through a ram air duct and absorbs the heat energy as it flows through the heat exchanger unit. In particular, in the case of relatively warm ambient air (for example on an airport apron in direct sunlight), the transfer of heat energy to the ambient air is less effective, such that the compression and expansion units of the air-conditioning apparatus consume more energy.

SUMMARY OF THE INVENTION

The invention is based on an object of providing an aircraft cooling system which permits energy-efficient and fuel-saving air-conditioning of an aircraft cabin. The invention is furthermore based on an object of providing an aircraft having an aircraft cooling system of this type.

The present invention relates to an aircraft cooling system having a ram air duct, a nozzle which is arranged in the ram air duct and which is connected to a first water-conducting line, and a refrigeration device. The refrigeration device in turn comprises a heat exchanger which is thermally coupled to the refrigeration device and which is configured to release waste heat generated by the refrigeration device to cooling air present in the ram air duct, a first water separator which is configured to separate off water from the air cooled by the refrigeration device, and a water outlet which is configured to conduct water obtained in the first water separator into the first water-conducting line.

The nozzle, which is arranged in the ram air duct, can thus be supplied with the (separated-off) water obtained in the refrigeration device, wherein the nozzle distributes the water into the cooling air present in the ram air duct. The nozzle may, in particular, be a spray nozzle which sprays the water out of the first water-conducting line in the form of small droplets into the cooling air. The water sprayed into the cooling air evaporates, whereby the cooling air is cooled owing to the enthalpy of evaporation of the water.

Furthermore, the water outlet may have an inlet which is configured to be connected to a second water-conducting line. Here, the water outlet may be furthermore configured to generate a negative pressure at the inlet. It is thus possible for water that is present in the second water-conducting line to be supplied likewise to the first water-conducting line, and thus to the nozzle, via the inlet of the water outlet. By means of the additional enthalpy of evaporation of the additionally supplied water, better (pre-)cooling of the cooling air can be achieved.

For example, the water outlet may form a Venturi nozzle, wherein the negative pressure formed by the Venturi nozzle is applied via the inlet of the water outlet to the second water-conducting line. In the Venturi nozzle, the negative pressure arises, in particular, owing to an entrainment of the fluid (water) from the second water-conducting line owing to the flow of the fluid (water) from the water outlet into the first water-conducting line. The formation of a Venturi nozzle offers the advantage, in particular in an aircraft, that only few additional components are required for the conveyance of the water out of the second water-conducting line, which components furthermore have no moving parts. The associated weight saving, and the reduced maintenance outlay likewise contribute to an energy-efficient and also cost-reduced aircraft cooling system.

In the case of a water outlet in the form of a Venturi nozzle, it is possible, owing to the negative pressure that is generated, for an absolute pressure of between 200 and 900 hPa to prevail at the inlet. In other words, the negative pressure may amount to between 100 and 800 hPa, wherein the Venturi nozzle is used usually only when the aircraft is in operation on the ground, that is to say, under normal ambient conditions with an ambient air pressure of approximately 1000 hPa. The negative pressure that can be generated is self-evidently dependent on the fluids in the two lines, in particular, on the vapor pressure of the fluid to be drawn in and of the driving fluid. For example, the water passing from the water outlet (driving fluid) may be at approximately 4-7° C., and the water present in the second water-conducting line (fluid to be drawn in) may be at approximately 6-18° C., whereby the respective vapor pressure is the defining parameter for the maximum negative pressure to be generated.

In a further embodiment, the aircraft cooling system may comprise a mixing chamber which is configured to mix two or more air streams and to discharge a mixed air stream. The mixing chamber may additionally comprise a second water separator, which is configured to separate off condensation water that precipitates out in the mixing chamber, wherein the second water separator is connected via the second water-conducting line to the inlet of the water outlet of the refrigeration device. The two air streams mixed in the mixing chamber are normally at different temperatures, wherein the relatively warm air stream normally also has higher absolute air humidity. When such air streams are mixed, the water can precipitate out of the relatively warm air stream as condensation water.

Owing to the negative pressure prevailing in the second water-conducting line, which negative pressure is generated from the water outlet of the refrigeration device, the water precipitating out in the second water separator is suctioned away and supplied via the water outlet of the refrigeration device to the nozzle. Thus, with a simple design, additional water can be provided for cooling the ambient air (cooling air). Otherwise, condensation water that precipitates out would be discharged into the surroundings without being utilized further. Owing to the negative pressure prevailing in the second water-conducting line, there is no need for a conveying device for the water to be provided in the mixing chamber or in the second water separator. It is thus possible for even existing systems to be easily and inexpensively converted.

When the aircraft is in operation on the ground, and, in particular, while passengers are on board, the recirculation air supplied to the mixing chamber from the aircraft cabin has a high water content, which is released during the mixing with the fresh air cooled by the refrigeration device. Here, depending on the design of the refrigeration device, an additional cooling power in the range from 3% to 15% of the otherwise normal cooling power can be achieved.

In a further embodiment, the first water separator and/or the water outlet of the refrigeration device may be configured to pressurize the water that is introduced into the first water-conducting line. By means of the water thus pressurized, this water is forced through the water outlet and onwards through the first water-conducting line to the nozzle. In the case of a water outlet designed as a Venturi nozzle, the resulting movement of the water in the water outlet and the first water-conducting line also generates the negative pressure at the inlet. In this way, it is possible in a simple manner for water to be supplied via the inlet, and the second water-conducting line connected thereto, to the water obtained by means of the first water separator.

Furthermore, the refrigeration device may be configured to apply compressed air to the first water separator, such that the pressure is imparted to the water introduced into the first water-conducting line by the water separated off in the first water separator. Through the use of compressed air in the water separator or in a component thereof, the water collected in the water separator or in the component thereof is forced to the water outlet, whereby the water is forced (conveyed) onwards into the first water-conducting line. The pressure of the compressed air may lie between 1100 and 5000 hPa or, in particular, between 2500 and 4000 hPa.

Alternatively or in addition, the first water separator and/or the water outlet of the refrigeration device may comprise a conveying device which is configured to convey the water separated off in the first water separator through the first water-conducting line. The conveying device may be in the form of a piston pump, a rotary pump or some other turbomachine. The collected water can thus be conveyed through the first water-conducting line even if no compressed air or insufficient compressed air is available for the first water separator.

In a further embodiment, the aircraft cooling system may furthermore comprise a source of compressed air, which is configured to supply compressed air to the refrigeration device. Here, the refrigeration device may be configured to expand the compressed air and cool it in the heat exchanger. It is self-evidently possible for the refrigeration device to comprise further components, including further heat exchangers. As a result of the expansion of the compressed air, the air is cooled further, whereby cooled process air can ultimately be made available in the aircraft by means of the aircraft cooling system.

The compressed air supplied by the source may furthermore be utilized for applying compressed air to the first water separator. For example, a small part of the compressed air may be conducted into or through the water separator such that a higher pressure prevails in the interior of the water separator than in the ambient air into which the nozzle opens. In this way, it is possible in a simple manner, and without an additional conveying device, for water that precipitates out in the refrigeration device to be forced into the ambient air in the ram duct.

Furthermore, the aircraft cooling system may comprise a third water separator, which is configured to separate off water at an inlet opening for a feed air stream which is supplied to the source for the generation of the compressed air. Here, the third water separator can be connected by means of an outlet to the inlet of the water outlet of the refrigeration device. For example, if rain or spray water is present in the ambient air drawn in by the source, or if (rain) water flows over the outer skin of the aircraft into an inlet opening of the source, as much water as possible should be captured before the ambient air flows into the source of compressed air. For example, the source of compressed air may be a supercharging blower or auxiliary engine specifically for the compression of a gas (air), which supercharging blower or auxiliary engine could be damaged owing to an excessively high water content in the air that is drawn in. By contrast, in an intake duct of the source of compressed air, use could be made of a water capturing device (water separator), for example in the form of a depression in which water present in the feed air stream, and/or inflowing surface water, collects. The intake duct is situated between the inlet opening and the actual source of compressed air, that is to say, the supercharging blower or auxiliary engine. This water capturing device (depression) may have the outlet for captured water, which outlet is connected to the inlet of the water outlet of the refrigeration device, such that the captured water is suctioned away.

Furthermore, in particular in the presence of high relative air humidity in the ambient air from which the source of compressed air is fed, a high expenditure of energy is necessary in order to dehumidify the compressed air. In other words, an additional burden is placed on the refrigeration device to adjust the compressed process air supplied to it to a relative air humidity for the supply into an aircraft region. For example, the relative air humidity in a passenger cabin of the aircraft should amount to no higher than 60%. The water collected in the third water separator may be used on its own, or in addition to other water sources, via the second water-conducting line to the nozzle for the cooling of the ambient air. Here, too, owing to the negative pressure generated at the inlet of the water outlet, the water collected by the third water separator can be easily suctioned away and conveyed to the nozzle. The increased energy requirement of the refrigeration device in the presence of high relative air humidity of the ambient air can thus be at least partially reduced again.

In a further embodiment, the ram air duct may comprise an air inlet and an air outlet, such that ambient air can flow through the ram air duct from the air inlet to the air outlet, wherein the heat exchanger is arranged downstream of the nozzle. This permits an efficient utilization of the cooled ambient air by the heat exchanger of the refrigeration device.

Furthermore, the ram air duct may have an air conveying device for conducting ambient air through the ram air duct. In particular, when the aircraft is in operation on the ground, the air conveying device permits the efficient operation of the refrigeration device. The air conveying device may be implemented in the form of a blower.

In a further embodiment, the mixing chamber may furthermore comprise a first inlet which is configured to introduce a fresh air stream generated by the refrigeration device into the mixing chamber, a second inlet which is configured to introduce a recirculation air stream extracted from an aircraft section into the mixing chamber, and an outlet which is configured to supply the air streams introduced into the mixing chamber and mixed there to the aircraft section.

The inlet of the water outlet of the refrigeration device may furthermore be connected to any water-conducting line via which water from some other region of the aircraft must be discharged. It is thus possible for the technology described here to be used to draw off water, and discharge this to the surroundings, using simple and lightweight means. Even if additional cooling is not required, it is thus possible for water to be discharged from regions of the aircraft easily and in an energy-efficient manner.

According to a further aspect, an aircraft comprises an aircraft cooling system according to one or more of the above-described variants and embodiments.

The embodiments, variants and aspects described here may be combined in any desired manner, such that further embodiment variants that are not explicitly described are encompassed.

BRIEF DESCRIPTION OF THE DRAWINGS

Exemplary embodiments of the invention will be described in more detail below on the basis of the drawings.

DETAILED DESCRIPTION OF THE PREFERRED EMBODIMENTS

In accordance with the present invention, an aircraft cooling system having a negative-pressure-generating water outlet is provided, and an aircraft having such an aircraft cooling system is described.

Figure 1:
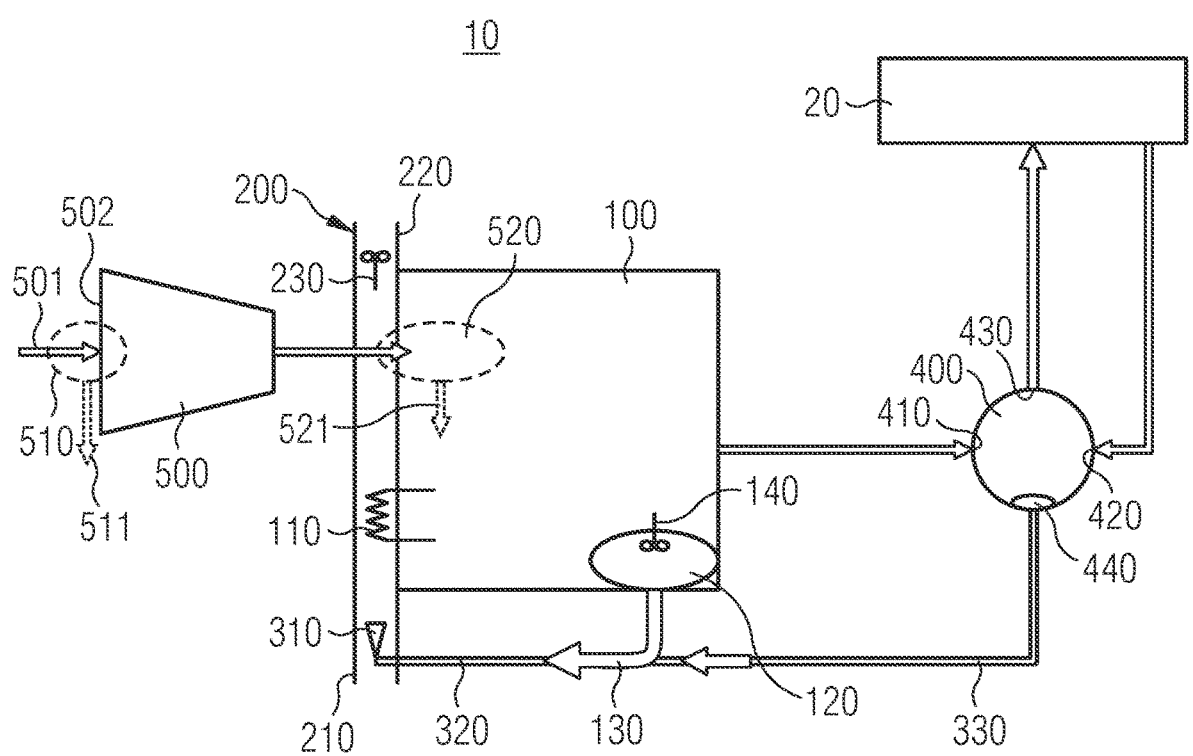
FIG. 1 schematically shows an aircraft cooling system.

FIG. 1 schematically illustrates an aircraft cooling system 10. The aircraft cooling system comprises a refrigeration device 100, which has a heat exchanger 110 thermally coupled to the refrigeration device 100. The heat exchanger 110 is configured to release waste heat generated by the refrigeration device 100 to cooling air present in a ram air duct 200. For this purpose, the heat exchanger 110 is arranged in the ram air duct 200. For example, the heat exchanger 110 arranged in the ram air duct 200 is connected to the refrigeration device 100 via lines through which air to be cooled by the refrigeration device 100 flows. The heat exchanger 110 thus constitutes a thermal coupling between the air to be cooled and the cooling air present in the ram air duct 200. Here, the air to be cooled is separated from the cooling air by the heat exchanger 110. In one design variant, the ram air duct 200 may also lead through the refrigeration device 100, such that the lengths of the lines conducting the air to be cooled are kept as short as possible.

Figure 3:
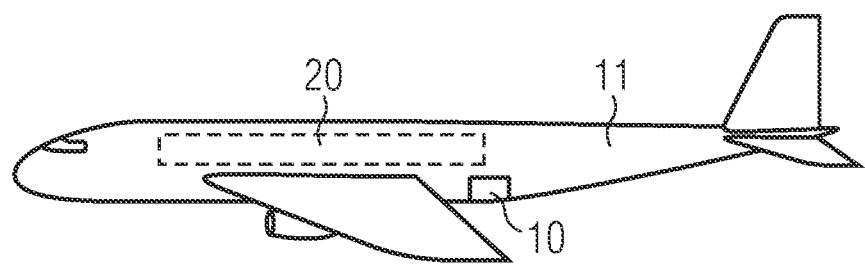

In order to make sufficient cooling air available in the ram air duct 200, the ram air duct 200 has an air inlet 210 and an air outlet 220. In this way, the cooling air can flow in through the air inlet 210 and can flow out through the air outlet 220. The air inlet 210 and air outlet 220 may be provided at an outer skin of an aircraft 11 (FIG. 3) in which the aircraft cooling system 10 is installed, and may optionally be opened and closed by means of corresponding flaps (not illustrated). The air inlet may be configured such that, when the aircraft 11 is in flight, air flows through the ram air duct 200 owing to the ram pressure caused by the relative wind. Furthermore, an air conveying device 230 may be arranged in or at the ram air duct 200, such that a sufficient cooling air flow can be achieved even in the presence of a low ram pressure or when the aircraft is in operation on the ground.

The refrigeration device 100 may furthermore have a first water separator 120 which is configured to separate off water from the air cooled by the refrigeration device 100. This separating-off of water may be realized, for example, by means of condensation as the air is cooled, optionally also by means of a separately cooled water separator 120. The water obtained by means of the first water separator 120 may be supplied to a water outlet 130 of the refrigeration device 100. The water outlet 130 is configured to conduct the water obtained in the first water separator 120 into a first water-conducting line 320.

Figure 2:
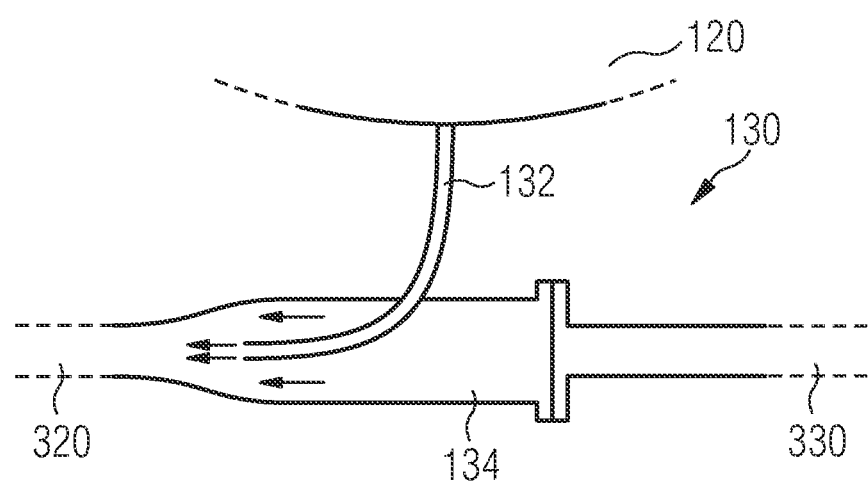
FIG. 2 schematically shows a more detailed view of a water outlet of an aircraft cooling system, and FIG. 3 schematically shows an aircraft having an aircraft cooling system.

As is schematically illustrated in FIG. 2, the water outlet 130 may have an inlet 134 which differs from an inlet (not shown) via which the first water separator 120 is connected to the water outlet 130. The inlet 134 described here is configured to be connected to a second water-conducting line 330. The water outlet 130 is furthermore configured to generate a negative pressure at the inlet 134. By means of the negative pressure thus generated, a fluid, for example water, is drawn from the second water-conducting line into the inlet 134.

For example, the water outlet 130 may form a Venturi nozzle, wherein the negative pressure formed by the Venturi nozzle is applied via the inlet 134 to the second water-conducting line 330. In the schematic illustration of FIG. 2, the water outlet 130 comprises a drive nozzle 132 which conducts the water from the first water separator 120 to the first water-conducting line 320. By means of a collector nozzle 133 at which the inlet 134 is provided, a negative pressure is generated by the water emerging from the drive nozzle 132. In other words, the water emerging from the drive nozzle 132 entrains the water flowing in via the collector nozzle 133, whereby water present in the second water-conducting line 330 is drawn in, that is to say a negative pressure is generated. By means of this negative pressure, the water is drawn in from the second water-conducting line 330 and is mixed in the collector nozzle 133 with the water emerging from the drive nozzle 132, and is conveyed together into the first water-conducting line 320.

The arrangement of the drive nozzle 132 and collector nozzle 133 is self-evidently not restricted to the arrangement illustrated in FIG. 2. Accordingly, the drive nozzle 132 extending from the water outlet 130 may run to the first water-conducting line 320 without a curvature, while the collector nozzle 133 is arranged around the drive nozzle 132 and the second water-conducting line 330 and/or the inlet 134 are arranged at an angle with respect to the longitudinal extent of the drive nozzle 132.

The water obtained from the first water separator 120, and optionally the additional water originating from the second water-conducting line 330, is supplied via the first water-conducting line 320 to a nozzle 310. The nozzle 310 is arranged in the ram air duct 200. The nozzle 310 is configured so as to spray the water supplied via the first water-conducting line 320 into the ram air duct 200, whereby the temperature of the cooling air present in the ram air duct 200 is lowered owing to the enthalpy of evaporation of the water. As illustrated in FIG. 1, the nozzle 310 is arranged upstream of the heat exchanger 110 of the refrigeration device 100, in order to cool the cooling air prior to the transfer of heat energy by means of the heat exchanger 110. The expressions "upstream" and "downstream" are directional terms respectively indicating counter to or with the respective fluid stream, for example the air stream in the ram air duct 200.

The aircraft cooling system may furthermore comprise a mixing chamber 400 which is configured to mix two or more air streams and to discharge a mixed air stream. For example, a first air stream may be cooled process air from the refrigeration device 100, which flows into the mixing chamber 400 via a first inlet 410. Via a second inlet 420, recirculation air can be introduced into the mixing chamber 400. The recirculation air may originate from any aircraft section 20, for example a passenger cabin, a cockpit, a freight compartment, etc. Via an outlet 430, the air streams mixed in the mixing chamber 400 (from the inlets 410 and 420) can be conducted into the aircraft section 20 and/or other aircraft sections. In this way, by means of the mixing chamber 400, the aircraft section 20 can be supplied with fresh air at a desired temperature and a desired pressure, while the recirculation air (second inlet 420) is only partially exchanged.

The mixing chamber 400 may comprise a second water separator 440, which is configured to separate off condensation water that precipitates out in the mixing chamber 400. The second water separator 440 may furthermore be connected via the second water-conducting line 330 to the inlet 134 of the water outlet 130 of the refrigeration device 100. By means of the negative pressure provided at the inlet 134, the water can be suctioned away from the second water separator 440 via the second water-conducting line 330 without the need for an additional conveying device for the water.

Furthermore, the aircraft cooling system may comprise a source 500 of compressed air, which source is configured to supply compressed or condensed air to the refrigeration device 100. The source 500 for compressed air may be an engine, an auxiliary engine (APU) or a separate compressor. The refrigeration device 100 uses the compressed or condensed air (also referred to as "bleed air" in the case of an engine or APU as source 500) for the refrigeration, by virtue of the compressed air being expanded and cooled in the heat exchanger 110. It is self-evidently possible for further heat exchanger units and multiple compression and expansion cycles to be provided in the refrigeration device 100.

Illustrated in FIG. 1 by dashed lines is a third water separator 510 which is configured to separate off water at an inlet opening 502 from a feed air stream 501 which is supplied to the source 500 for the generation of the compressed air. The third water separator 510 is furthermore connected via an outlet 511 to the inlet 134 of the water outlet 130 of the refrigeration device 100. Thus, to the other mentioned water sources, the air to be compressed can also be dehumidified before being supplied into the source 500 of compressed air. It is likewise possible for water (for example resulting from rain or spray water) flowing in at an inlet opening of the source 500 of compressed air to be captured and collected. In this way, the source 500 of compressed air can be protected, because it is normally a supercharging blower or similar compressor which is configured for compressing a gaseous fluid and which would be damaged by an inflowing liquid.

In a further embodiment, which is likewise illustrated in FIG. 1 by dashed lines, a fourth water separator 520 may be provided, which is configured to separate off water from the compressed air of the source 500. The fourth water separator 520 is furthermore connected via an outlet 521 to the inlet 134 of the water outlet 130 of the refrigeration device 100. Thus, to the other mentioned water sources, the compressed air can also be dehumidified before being supplied into the refrigeration device 100.

The fourth water separator 520 is illustrated in FIG. 1 as also projecting partially into the ram air duct. This is intended to illustrate that the third water separator 520 can optionally or alternatively separate off moisture from the cooling air in the ram air duct 200. For this purpose, the fourth water separator 520 is arranged at as short a distance as possible (upstream) of the outlet 220 of the ram air duct 200. Water sprayed into the cooling air of the ram air duct 200 by means of the nozzle 310 can thus be recovered, for example, in the presence of high ambient air temperatures and low air humidity of the ambient air.

In order for the water obtained by means of one of the water separators 120, 440, 510, 520 to be conveyed to the nozzle 310 in an efficient manner, the first water separator 120 and/or the water outlet 130 of the refrigeration device 100 may be configured to pressurize the water that is introduced into the first water-conducting line 320. For this purpose, the refrigeration device 100 may apply compressed air to the first water separator, such that the pressure is imparted to the water introduced into the first water-conducting line 320 by the water separated off in the first water separator. In other words, the water situated in the first water separator 120 and/or the water situated in the water outlet 130 is conveyed by means of compressed air in the direction of the first water-conducting line 320 and nozzle 310.

Alternatively or in addition, the first water separator 120 and/or the water outlet 130 may comprise a conveying device 140 which is configured to convey the water separated off in the first water separator 120 through the first water-conducting line 320 to the nozzle 310. The conveying device 120 may be a piston pump or rotary pump. The optional conveying device 120 may be used, in particular, when it is not ensured for all operating phases that the otherwise generated pressure on the water in the first water separator 120 and/or water outlet 130 is sufficient to convey the water to the nozzle 310.

The variants, refinements and exemplary embodiments discussed above serve merely for describing the claimed teaching, but do not restrict this to the variants, refinements and exemplary embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft cooling system having:
   a ram air duct;
   a nozzle arranged in the ram air duct and connected to a first water-conducting line;
   a refrigeration device, comprising:
      a heat exchanger thermally coupled to a different portion of the refrigeration device and configured to release waste heat generated by the refrigeration device to cooling air present in the ram air duct,
      a first water separator configured to separate off water from air cooled by the refrigeration device, and
      a water outlet configured to conduct water obtained in the first water separator into the first water-conducting line,
      the water outlet having an inlet configured to be connected to a second water-conducting line,
      the water outlet furthermore being configured to generate a negative pressure at the inlet;
   a mixing chamber configured to mix two or more air streams to discharge a mixed air stream, wherein the mixing chamber comprises:
      a second water separator configured to separate off condensation water that precipitates out in the mixing chamber,
      the second water separator being connected via the second water-conducting line to the inlet of the water outlet of the refrigeration device upstream of the first water separator;
   a source of compressed air configured to supply compressed air to the refrigeration device;
   the refrigeration device being configured to expand the compressed air and cool the compressed air in the heat exchanger; and
   a third water separator configured to separate off water at an inlet opening for a feed air stream supplied to the source of the compressed air, wherein the third water separator is connected by means of an outlet to the inlet of the water outlet of the refrigeration device.

2. The aircraft cooling system according to claim 1, wherein the water outlet forms a Venturi nozzle, wherein a negative pressure formed by the Venturi nozzle is applied via the inlet to the second water-conducting line.

3. The aircraft cooling system according to claim 1, wherein at least one of the first water separator or the water outlet of the refrigeration device is configured to pressurize the water that is introduced into the first water-conducting line.

4. The aircraft cooling system according to claim 3, wherein the refrigeration device is configured to apply compressed air to the first water separator, such that the pressure is imparted to the water introduced into the first water-conducting line by the water separated off in the first water separator.

5. The aircraft cooling system according to claim 3, wherein at least one of the first water separator or the water outlet of the refrigeration device comprises a conveying device configured to convey the water separated off in the first water separator through the first water-conducting line.

6. The aircraft cooling system according to claim 1, furthermore comprising:
   a fourth water separator configured to separate off water from the compressed air of the source, wherein the fourth water separator is connected by means of an outlet to the inlet of the water outlet of the refrigeration device.

7. The aircraft cooling system according to claim 1, wherein
   the ram air duct comprises an air inlet and an air outlet, such that ambient air flows through the ram air duct from the air inlet to the air outlet, wherein the heat exchanger is arranged downstream of the nozzle.

8. The aircraft cooling system according to claim 1, wherein the ram air duct has an air conveying device for conducting ambient air through the ram air duct.

9. The aircraft cooling system according to claim 1, wherein the mixing chamber furthermore comprises:
   a first inlet configured to introduce a fresh air stream generated by the refrigeration device into the mixing chamber,
   a second inlet configured to introduce a recirculation air stream extracted from an aircraft section into the mixing chamber, and
   an outlet configured to supply the fresh and recirculation air streams introduced into the mixing chamber and mixed there to the aircraft section.

10. An aircraft comprising an aircraft cooling system according to claim 1.

* * * * *